(12) United States Patent
Schreck

(10) Patent No.: US 6,493,160 B1
(45) Date of Patent: Dec. 10, 2002

(54) PSEUDO RAID IMPLEMENTATION WITHIN A SINGLE DISK DRIVE

(75) Inventor: Erhard Schreck, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/590,311

(22) Filed: Jun. 8, 2000

(51) Int. Cl.⁷ .................................................. G11B 5/86
(52) U.S. Cl. ............................. 360/15; 360/47; 360/63; 360/31
(58) Field of Search .............................. 360/47, 63, 31, 360/15, 53; 711/114, 4; 369/84, 53.1; 714/770, 769, 6; 324/210, 212, 226

(56) References Cited

U.S. PATENT DOCUMENTS 3,729,725 A * 4/1973 Denney et al. ............... 360/47
5,390,313 A * 2/1995 Yanai et al. .................. 360/47
6,118,602 A * 9/2000 de la Soujeole .............. 360/67

* cited by examiner

Primary Examiner—Alan T. Faber
(74) Attorney, Agent, or Firm—Tejpal S. Hansra

(57) ABSTRACT

A single disk drive uses data mirroring techniques to store data within the drive. Each piece of data received by the disk drive for storage is written to at least two different storage locations within the drive. Preferably, each of the different storage locations occurs on a different disk surface, but within the same cylinder, of the drive. In one embodiment, each disk surface in the disk drive is divided into N distinct regions that are each 360/N degrees out of phase with one another. Each region on a disk surface is aligned with a corresponding region on each other disk surface in the disk drive. Data stored in each region on a disk surface is then mirrored within a different region on a different disk surface in the drive. Using such a technique allows a significant reduction in latency to be achieved during subsequent read operations.

7 Claims, 5 Drawing Sheets

| GROUP | FIRST LOCATION | | SECOND LOCATION | |
|---|---|---|---|---|
| | SURFACE | REGION | SURFACE | REGION |
| 1 | A1 | X | B1 | Y |
| 2 | A1 | Y | B1 | X |
| 3 | A2 | X | B2 | Y |
| 4 | A2 | Y | B2 | X |
| 5 | C1 | X | D1 | Y |
| 6 | C1 | Y | D1 | X |
| 7 | C2 | X | D2 | Y |
| 8 | C2 | Y | D2 | X |

Fig. 4

PSEUDO RAID IMPLEMENTATION WITHIN A SINGLE DISK DRIVE

FIELD OF THE INVENTION

The invention relates generally to data storage systems and, more particularly, to disk-based data storage systems.

BACKGROUND OF THE INVENTION

Modern disk drives are achieving continuously increasing data densities within their storage media. This increase in data density, however, has increased concerns regarding data integrity. That is, as the area on the disk surface that is used to store a single bit of digital data is decreased, it becomes more challenging to reliably read and write data to the storage medium. Many users therefore resort to techniques, such as performing periodic tape backups, to insure reliable data storage and reproduction. These techniques, however, are often very time-consuming and expensive to implement.

Therefore, there is a need for a method and apparatus that is capable of increasing the reliability of data storage and reproduction in a high capacity disk drive. Preferably, the method and apparatus will be transparent to users of the disk drive and will require no additional effort on the part of the user to achieve the reliability benefits.

SUMMARY OF THE INVENTION

The present invention relates to a data storage system that utilizes data mirroring within a single disk drive to provide enhanced data storage reliability. The principles of the invention can be implemented in drives having a single disk and also in drives using a multi-disk stack. Because each piece of user data is stored at two or more locations within the disk drive, concerns about data loss or corruption are significantly reduced. That is, even if data stored at one location has been defectively written or becomes corrupted after it has been written, the same data will normally be available at the mirror location for delivery to an attached host. In accordance with the invention, the data mirroring is preferably performed using two (or more) different disk surfaces within the disk drive. Thus, if a problem develops in the transducer/disk interface of one disk surface (e.g., a read transducer fails), the same data is still available from the other disk surface(s).

In one embodiment, the disk surfaces within the disk drive are each divided into a plurality of different regions (e.g., two regions, X and Y) and each region on a particular disk surface is aligned with the same region on the other disk surface(s) within the drive. Data from one region (e.g., region X) on one disk surface is then mirrored within at least one different region (e.g., region Y) on another disk surface. Preferably, all mirrored data will be stored within the same cylinder of the disk drive. Fixed relationships are established in the disk drive between groups of regions that mirror one another in the drive (i.e., mirror groups). Preferably, the mirrored regions within the disk drive will occur 360/N degrees from one another (with respect to the disk axis of rotation) within the drive, where N is the number of regions on each disk surface. For example, in an embodiment where each disk surface is separated into two regions X and Y, a mirrored pair will always include one X region and one Y region which are 360/2 or 180 degrees out of phase and on different disk surfaces. In an embodiment having three regions on each disk surface, X, Y, and Z, the mirrored pairs will each be 360/3 or 120 degrees apart on different surfaces.

Because each block of data is stored in at least two different locations within the drive, and these two different locations occur at different circumferential positions about the disk(s) and within the same cylinder, an effective increase in the rotational speed of the platter can be achieved during read operations. For example, in a drive that uses two regions per disk surface, the same block of data can be read by either of two paired heads every 180 degrees of rotation of the disk platter. Thus, latency is reduced and the rotational speed of the platter is effectively doubled. This technique can also be extended to simulate a 3x, 4x, or greater increase in effective rotational velocity by adding additional mirrored regions to the data configuration.

BRIEF DESCRIPTION OF THE DRAWINGS

FIG. 4 is a table illustrating one approach for defining mirror groups for the disk stack illustrated in FIG. 3.

DETAILED DESCRIPTION OF A PREFERRED EMBODIMENT

Figure 1:
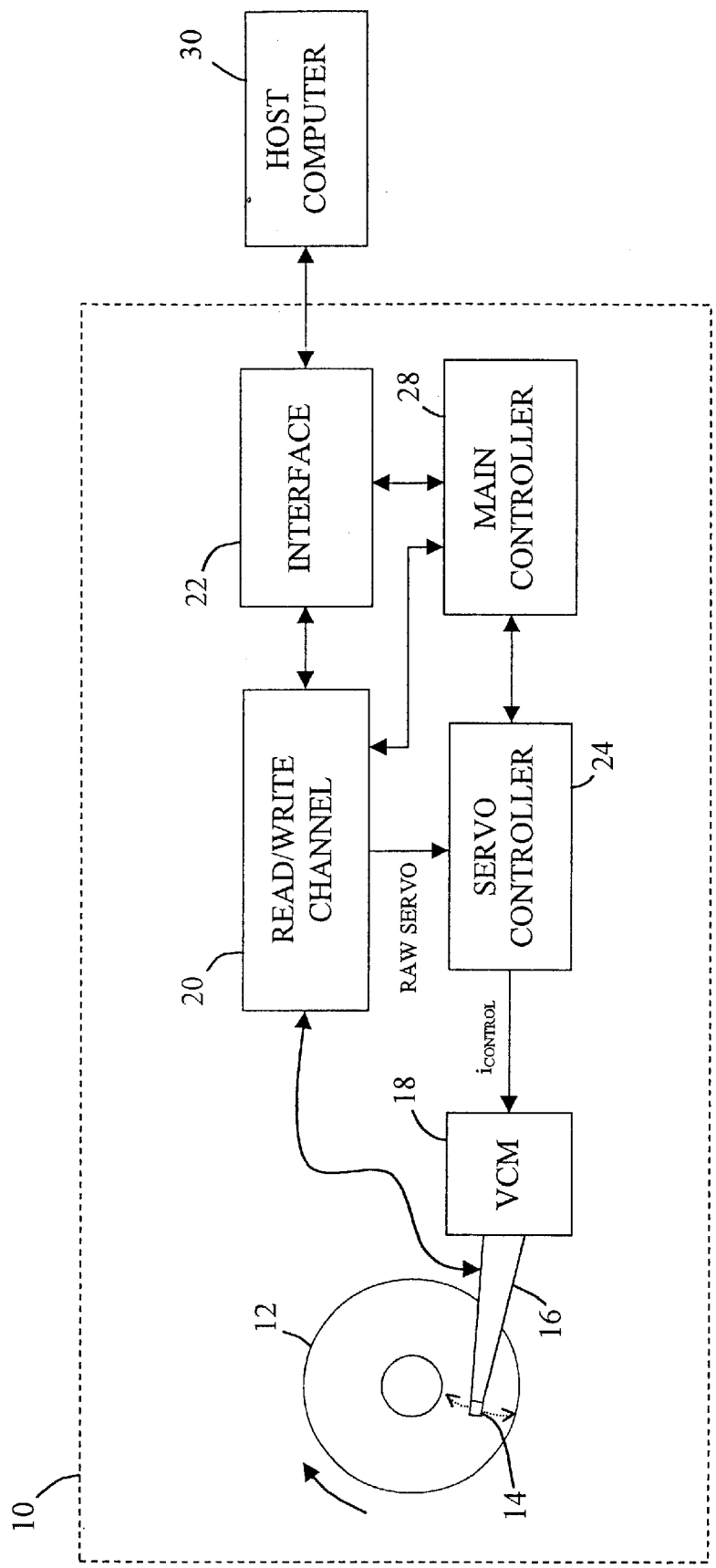
FIG. 1 is a block diagram illustrating a disk drive that can utilize the principles of the present invention.

The present invention relates to a data storage system that utilizes data mirroring within a single disk drive to provide enhanced data storage reliability. FIG. 1 is a block diagram illustrating a disk drive 10 that can utilize the principles of the present invention. The disk drive 10 is coupled to an external host computer 30 that uses the disk drive 10 as a mass storage device. As illustrated, the disk drive 10 includes: at least one data storage disk 12, at least one transducer 14, an actuator arm assembly 16, a voice coil motor (VCM) 18, a read/write channel 20, an interface unit 22, a servo controller 24, and a main disk drive controller 28. It should be appreciated that the blocks illustrated in FIG. 1 are functional in nature and do not necessarily represent discrete hardware elements. For example, in one approach, two or more of the functional blocks within the disk drive 10 are implemented in software within a common digital processor.

The disk drive 10 receives read and/or write requests from the host computer 30 and carries out the requests by performing data transfers between the at least one disk 12 and the host 30. The interface unit 22 is operative for providing an interface between the disk drive 10 and the host computer 30. During read and write operations, the interface unit 22 provides a communications path, including data buffering functions, between the host computer 30 and the read/write channel 20. In addition, the interface unit 22 is operative for receiving commands and requests from the host computer 30 and directing them to the main controller 28. The main controller 28 then carries out the commands by appropriately controlling the elements within the disk drive 10.

The read/write channel 20 is operative for, among other things, performing the data transformations necessary to provide communication between the host computer 30 and the disk 12. For example, during a write operation, the read/write channel 20 converts digital data received from the host computer 30 into an analog write current for delivery to the transducer 14. During a read operation, the read/write channel 20 provides the data transformations necessary for converting an analog read signal received from the transducer 14 into a digital representation that can be recognized by the host computer 30. The read/write channel 20 is also operative for separating out servo information read by the transducer 14 and for directing this servo information to the servo controller 24 for use in positioning the transducer 14.

The voice coil motor (VCM) 18 is operative for controllably positioning the transducer 14 with respect to disk 12 in response to a control signal (e.g., $i_{control}$) generated by the servo controller 24. When performing a read or write operation, the main controller 28 instructs the servo controller 24 to move the transducer 14 to a target track on the disk 12 so that a data transfer can take place. The servo controller 24 then generates a control signal to move the transducer 14 from a present location to the indicated target track in a process known as a "seek" operation. Once the transducer 14 has arrived at the target track, the servo controller 24 enters a "track follow" mode during which the transducer 14 is maintained in a substantially centered position above the target track. The bulk of the data transfer between the transducer 14 and the target track occurs during this track follow mode.

In a preferred embodiment, the disk drive 10 includes multiple disks 12 in a vertical stack arrangement with one transducer 14 for each operative disk surface. Typically, both surfaces of each disk 12 will be operative for storing user data and, therefore, the disk drive 10 will include two transducers 14 for each disk 12. The transducers 14 are all coupled to a single integrated actuator arm assembly 16 so that the transducers are substantially vertically aligned with one another through the stack and move together under the influence of the VCM 18. Other disk configurations, such as single disk arrangements and single-sided disk arrangements, can also be used in accordance with the present invention.

As described above, in accordance with the principles of the present invention, data mirroring is utilized within a single disk drive to provide enhanced data integrity within the drive. Each piece of data stored within the drive is written to two or more different locations on the disk(s) within the drive. Thus, if the data stored within one location is unreadable for any particular reason, the same data is still available within the other location(s) and is thus not permanently lost. In this manner, the reliability with which data is stored and retrieved in high capacity disk drives is increased. Many different methods for performing data mirroring within a single disk drive are possible in accordance with the present invention. In one approach, an example of which is described below, a mirroring technique is provided that divides each disk surface within a drive into two or more regions. Groups of such regions (i.e., mirror groups) are then defined within the disk drive for use in mirroring data. Preferably, each region within a mirror group will occur on a different disk surface than the other region(s) to improve data security. As will be described in greater detail, a disk drive implementing the above technique is capable of achieving an increase in the effective rotational speed of the disk(s) during some read operations and is thus capable of improving average read access times in the disk drive.

Figure 2:
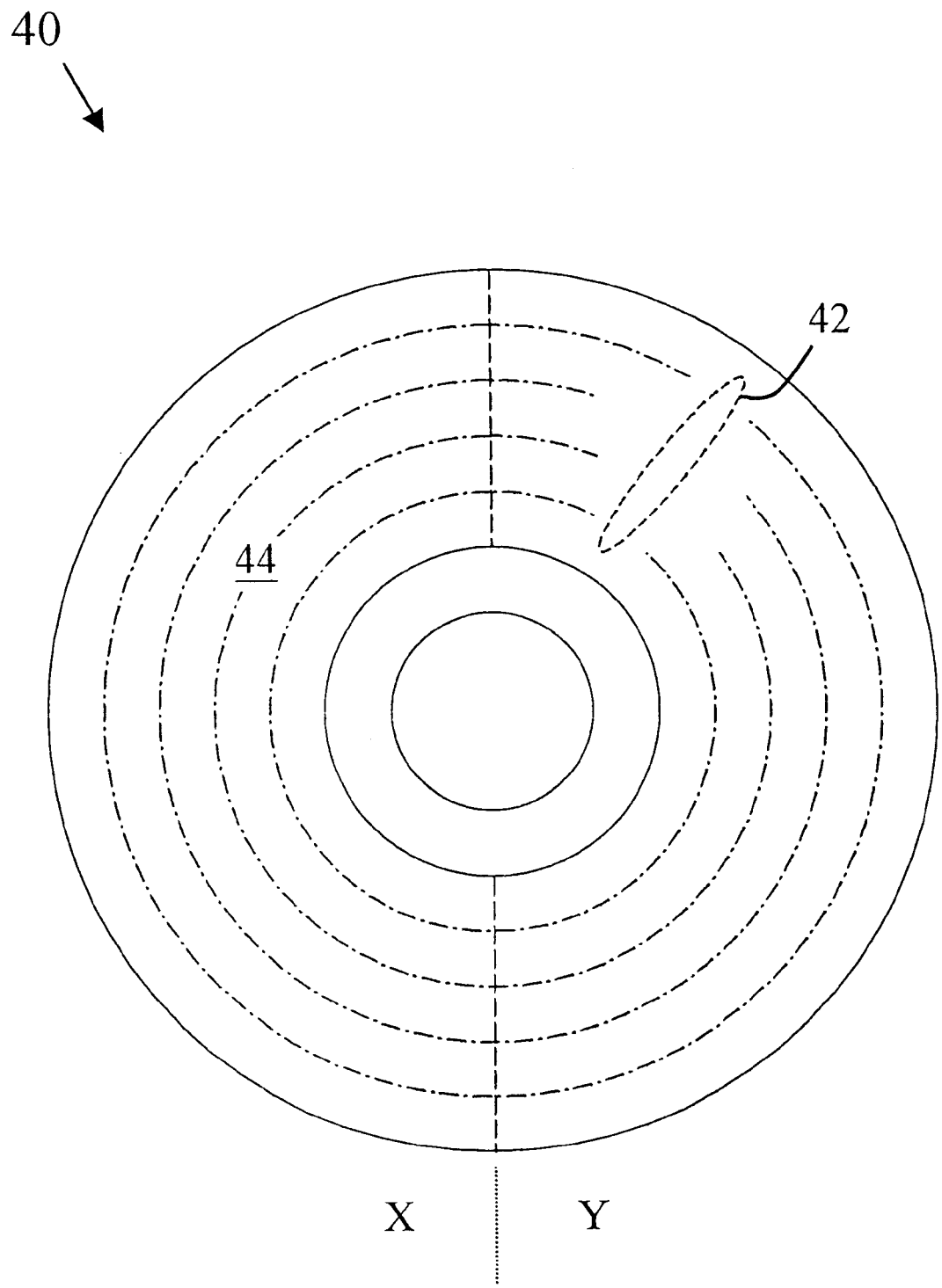
FIG. 2 is a top view of a data storage disk having a data configuration in accordance with one embodiment of the present invention.

FIG. 2 is a top view of a disk 40 illustrating a data configuration in accordance with one embodiment of the present invention. As illustrated, the upper surface 44 of the disk 40 includes a plurality of substantially concentric data storage tracks 42 that are used to store, among other things, digital user data. Although only four tracks are illustrated, it should be appreciated that a typical disk will include a multitude of such tracks, usually numbering within the thousands. Although not shown, the upper surface 44 of the disk 40 will also include servo regions within each track for use in storing servo information. In one embodiment, for example, the disk 40 includes conventional, radially-aligned servo spokes to provide the servo information.

Figure 3:
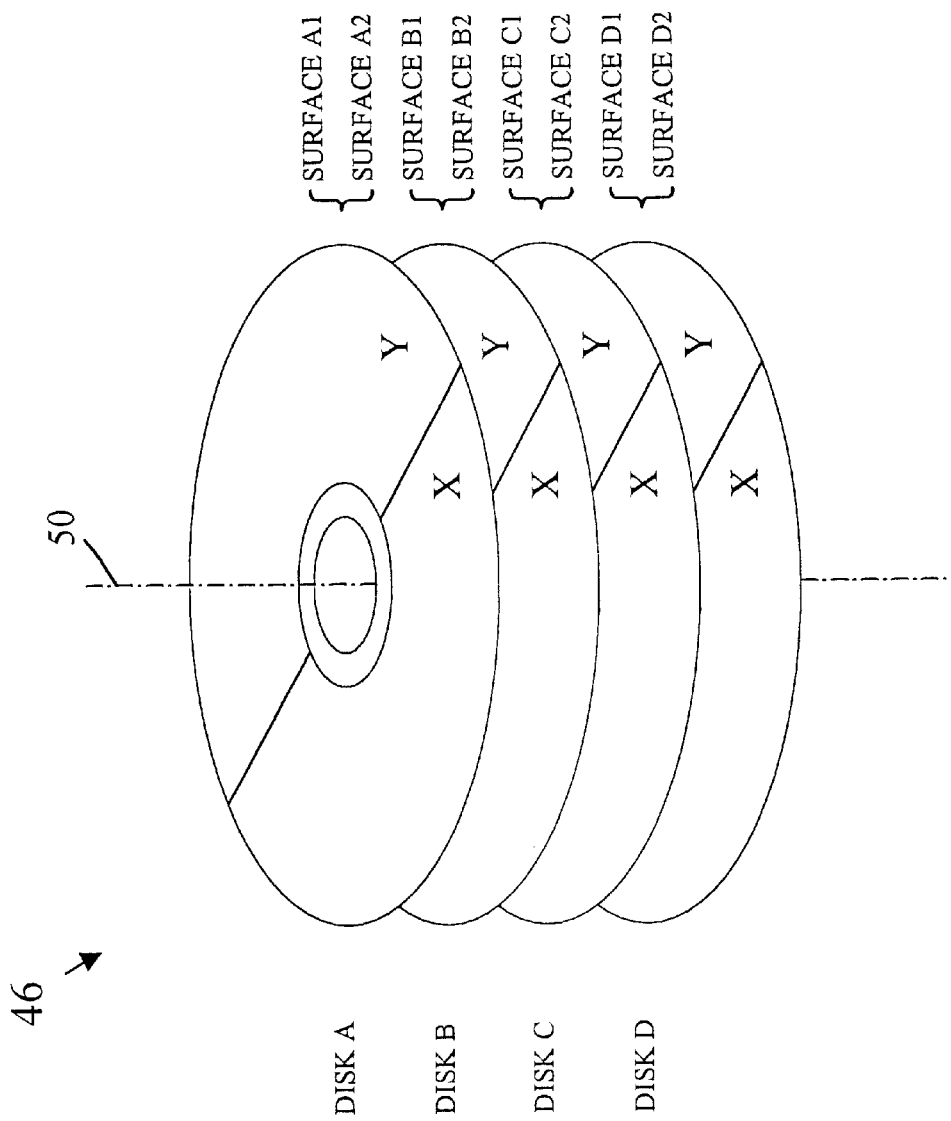
FIG. 3 is a diagram illustrating a disk stack having a plurality of disks that each utilize the data configuration illustrated in FIG. 2.

As illustrated in FIG. 2, the upper surface 44 of the disk 40 is divided into two different, non-overlapping regions (i.e., region X and region Y). Each of these regions is capable of storing data within the data tracks 42 in a conventional manner. In accordance with the invention, each of the regions X and Y on the upper surface 44 of the disk 40 has a corresponding region on another disk surface within the drive that is used to mirror the data in that region. The other region can occur on the opposite side of the disk 40 or on another disk in the drive, if any. FIG. 3 is a diagram illustrating a disk stack 46 having a plurality of disks (i.e., disks A, B, C, and D) that are aligned with one another along a common axis of rotation 50. Typically, these disks will be mounted on a common hub within the disk drive. As illustrated, each of the disks in the disk stack 46 has a data configuration on an upper surface thereof similar to the one illustrated in FIG. 2. Although not illustrated, the lower surfaces of the disks in the disk stack 46 also have this data configuration in the preferred embodiment. In addition, the X regions on each disk surface align with the X regions on the other disk surfaces in a vertical direction through the stack 46. Similarly, each Y region aligns with each other Y region in the stack 46. Thus, the transducers within the disk drive will all transition from region to region at substantially the same time. The X regions are thus 180 degrees out of phase with respect to the Y regions with regard to the rotation of the disk stack 46.

As described above, mirror groups are defined for the disk drive that each include multiple disk regions within the drive that store the same data. FIG. 4 is a table illustrating one approach for defining mirror groups for the disk configuration illustrated in FIG. 3. As illustrated in the table, 8 different mirror groups are defined, each having two different regions in which data is mirrored. For example, a first mirror group (i.e., group 1) includes a first location at region X on the upper surface of disk A (i.e., surface A1) and a second location at region Y on the upper surface of disk B (i.e., surface B1). Thus, any data written to this first location will also be written to the corresponding second location. Similarly, a second mirror group (i.e., group 2) includes a first storage location at region Y on the upper surface of disk A and a second storage location at region X on the upper surface of disk B. The same pattern is used for the remaining disk surfaces. It should be appreciated that any number of different grouping schemes can be implemented in accordance with the present invention and the scheme set out in FIG. 4 is not meant to be limiting.

The above-described approach can be extended to include any integer number N of regions per disk surface (where N is greater than 1). Preferably, the regions will be located 360/N degrees from one another on each disk surface and the same regions will vertically align through the stack as described above. For example, in embodiment, each disk surface is divided into three 120 degree wedge regions X, Y, and Z. Data is then mirrored in three different places within the stack on three different disk surfaces (e.g., region X on a first disk surface, region Y on a second disk surface, and region Z on a third disk surface).

In one aspect of the present invention, a simulated increase in disk rotation speed is achieved during read operations by taking advantage of the unique mirrored data configurations within the disk drive. For example, referring back to FIG. 3, the mirrored data within the different regions of a mirror group will occur in the same cylinder on their respective disk surfaces. Thus, once the read transducers reach the appropriate cylinder, the data will always be available (if the data is uncorrupted and all transducers are functioning) within a 180 rotation of the disk stack 46. Thus, an effective doubling of the disk rotation speed is achieved. Similarly, for a data configuration using N regions per disk surface, the effective increase in disk speed will be by a factor of N. The main controller 28 keeps track of the multiple locations associated with each mirror group and can thus determine which location one of the transducers will be able to read first for a new read request. The main controller 28 will then activate the appropriate read transducer at the proper time to read the data. Thus, the average latency experienced during read operations involving smaller files or data blocks is cut in half. Read operations involving larger amounts of data will generally have less of an improvement.

One drawback of using the above-described data mirroring technique within a disk drive is that write throughput is reduced. That is, a write request will normally require a full revolution of the disk stack to complete. The actual reduction will depend upon both the file size and the buffer capability of the disk drive. In addition, write requests involving larger files, such as those involving greater than N regions of data, will require a cylinder switch instead of a faster head switch. However, the impact of this can be reduced through the use of micro-actuator arrangements. In one approach, a write cache is used to temporarily store data that will later be transferred to the appropriate mirror region. The transfer to the mirror region from the write cache can be postponed until a period of relative inactivity in the disk drive to minimize the impact on write access times.

In one embodiment, the inventive principles are implemented within a disk drive having multiple independent channels. For example, with reference to FIG. 3, a disk drive that includes two independent write channels is able to write first data to region X on a disk surface A1 while simultaneously writing second data (that is different from the first data) to region X on surface B1. Then, when the transducers reach region Y, the disk drive can write the first data to region Y on surface B1 and the second data to region Y on surface A1. In this manner, twice as much data can be written within a single rotation of the disk stack than a single channel arrangement.

One of the benefits of the present invention is that it protects against a loss of data should, for example, one of the read transducers fail. In one embodiment of the invention, functionality is provided that is capable of detecting the failure of one or more transducers within the drive (e.g., SMART features). In accordance with one aspect of the invention, the disk drive uses this bad transducer information to determine which location to retrieve data from during a read operation. Consequently, the disk drive does not waste time attempting to retrieve data using an inoperative read transducer.

Figure 5:
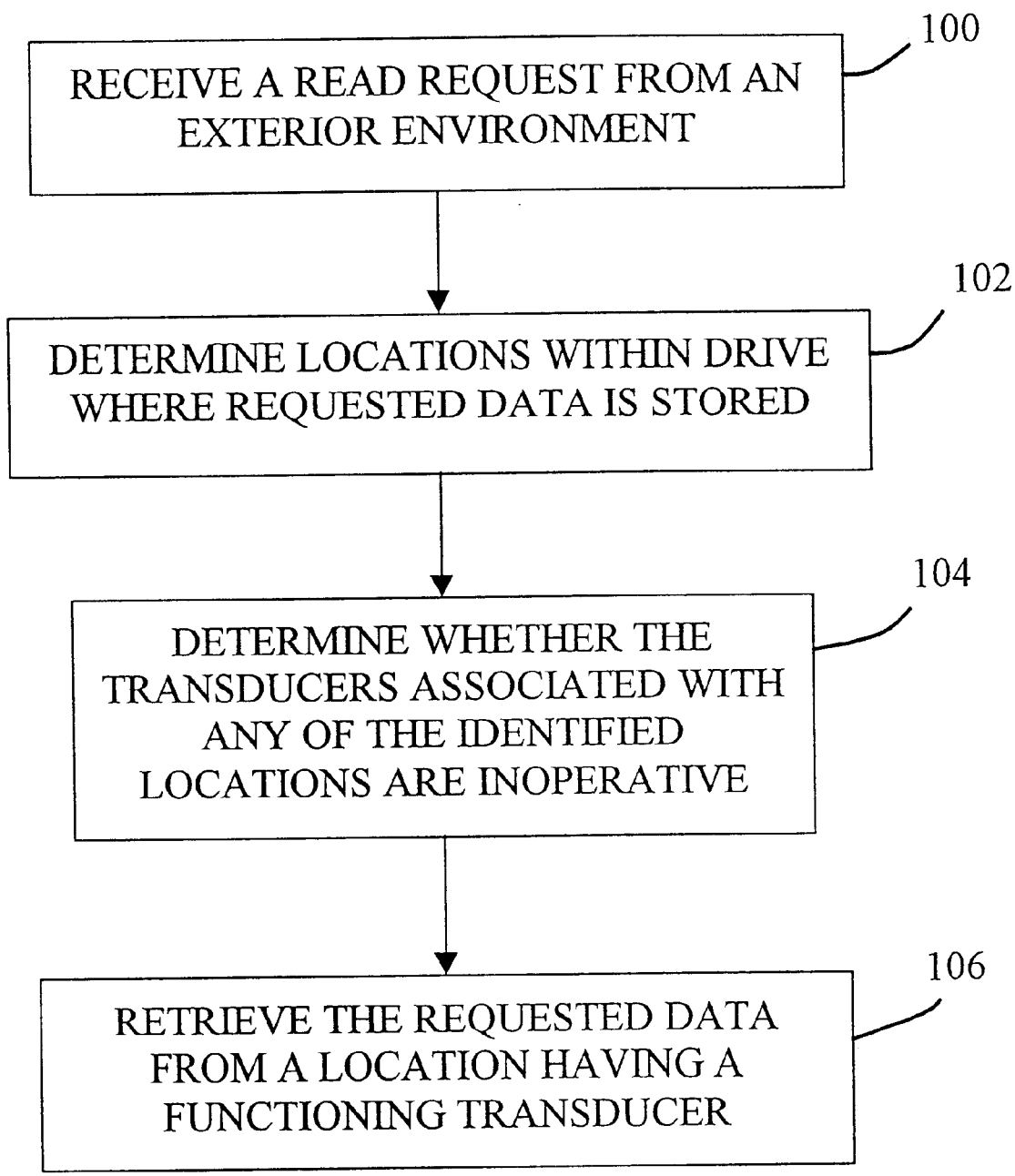
FIG. 5 is a flowchart illustrating a method for performing a read operation in accordance with one embodiment of the present invention.

FIG. 5 is a flowchart illustrating a method for performing a read operation in accordance with one embodiment of the present invention. First, a read request is received by a disk drive from an exterior environment (e.g., from a host computer) requesting that data from an identified disk location be transferred to the exterior environment (step 100). Next, the disk drive determines multiple storage locations within the drive where copies of the requested data are stored (step 102). The drive then determines whether any of the transducers associated with the identified locations are inoperative (step 104). In one approach, the disk drive maintains a list of defective transducers that can be quickly referenced by the main controller 28 during a read operation. The drive then proceeds to retrieve the requested data from a location that is associated with an operative read transducer and transfers this data to the requesting entity (step 106). Preferably, the disk drive will select the first identified disk location that will be traversed by an operative read transducer during the corresponding seek operation.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A disk drive comprising:

a set of disks for use in storing digital data, said set of disks being fixedly mounted to a single hub; and a controller for controlling the operation of the disk drive, said controller having a data mirroring mode within which data mirroring is used to store data within said set of disks and a non-data mirroring mode within which data mirroring is not used to store data within said set of disks, said controller also including means for entering one of said data mirroring mode and said non-data mirroring mode in response to input received from an exterior environment.

2. A disk drive comprising:

a set of disks for use in storing digital data, said set of disks being fixedly mounted to a single hub;

a plurality of transducers for use in reading data from said set of disks, said plurality of transducers being coupled to a common actuator arm and including a defective transducer; and a controller including:
means for receiving a read request from an exterior environment;
means for identifying multiple storage locations within said set of disks that include data corresponding to said read request, said multiple storage locations being located within a common cylinder of said set of disks;
means for initiating a seek operation to move said plurality of transducers to said common cylinder in response to said read request;
means for identifying the defective transducer; and
means for reading said data from one of said multiple storage locations using one of the plurality of transducers other than the defective transducer.

3. The disk drive of claim 2, further including means for identifying whether any of the multiple storage locations are associated with the defective transducer.

4. The disk drive of claim 2, wherein said mutans for reading reads the first storage location that can be reliably read by one of said plurality of transducers after said plurality of transducers reaches said common cylinder.

5. A method for use in reading data from a set of disks within a disk drive, said set of disks being coupled to a single hub within the disk drive, said method comprising the steps of:

providing a plurality of transducers associated with said set of disks, said plurality of transducers being coupled to a common actuator arm, wherein said plurality of transducers includes a defective transducer;

receiving a read request from an exterior environment;

identifying multiple storage locations within said set of disks that include data corresponding to said read request, said multiple storage locations being located within a common cylinder of said set of disks;

initiating a seek operation to move said plurality of transducers to said common cylinder in response to said read request;

identifying the defective transducer; and, reading said data from one of said multiple storage locations, wherein said data is purposefully read using one of said plurality of transducers other than the defective transducer.

6. The method of claim 5, further including the step of:
determining whether any of said multiple storage locations that include data corresponding to said read request are associated with the defective transducer.

7. The method of claim 5, wherein data is read from the first storage location that can be reliably read by one of said plurality of transducers after said plurality of transducers reaches said common cylinder.

* * * * *